US012323911B2

(12) United States Patent
Landais et al.

(10) Patent No.: US 12,323,911 B2
(45) Date of Patent: Jun. 3, 2025

(54) NON-3GPP INTERWORKING FUNCTION (N3IWF) SELECTION FOR STAND-ALONE NON-PUBLIC NETWORKS (SNPN)

(71) Applicant: Nokia Technologies Oy, Espoo (FI)

(72) Inventors: Bruno Landais, Pleumeur-bodou (FR); György Tamás Wolfner, Budapest (HU); Markus Sakari Isomäki, Espoo (FI); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 607 days.

(21) Appl. No.: 17/765,376

(22) PCT Filed: Oct. 1, 2019

(86) PCT No.: PCT/US2019/053981
§ 371 (c)(1),
(2) Date: Mar. 30, 2022

(87) PCT Pub. No.: WO2021/066807
PCT Pub. Date: Apr. 8, 2021

(65) Prior Publication Data
US 2022/0369219 A1  Nov. 17, 2022

(30) Foreign Application Priority Data
Sep. 30, 2019  (WO) ............... PCT/US2019/053758

(51) Int. Cl.
*H04W 48/18* (2009.01)
*H04L 5/00* (2006.01)
*H04W 72/0453* (2023.01)

(52) U.S. Cl.
CPC ........... *H04W 48/18* (2013.01); *H04L 5/0046* (2013.01); *H04W 72/0453* (2013.01)

(58) Field of Classification Search
None
See application file for complete search history.

(56) References Cited

U.S. PATENT DOCUMENTS

| 2018/0317157 | A1* | 11/2018 | Baek ..................... H04W 28/16 |
| 2019/0313234 | A1* | 10/2019 | Liu ....................... H04W 48/20 |
| 2022/0337993 | A1 | 10/2022 | Landais et al. | |

FOREIGN PATENT DOCUMENTS

| CN | 111757511 A | * | 10/2020 | ........ H04W 72/1205 |
| CN | 111867057 A | * | 10/2020 | ............ H04W 68/00 |

(Continued)

OTHER PUBLICATIONS

China Telecom, "On Private Network Support for NG-RAN." Ljubljana, Slovenia, Aug. 26-30, 2019, R3-193832 < https://www.3gpp.org/ftp/tsg_ran/WG3_lu/TSGR3_105/Docs/R3-193832.zip>.*

(Continued)

*Primary Examiner* — Andrew C Oh
(74) *Attorney, Agent, or Firm* — Robert P. Michal, Esq.; Carter, DeLuca & Farrell LLP

(57) ABSTRACT

A plurality of interworking functions, which provide interworking between a communication network acting as an access network and a non-public network, is associated with a plurality of sites or network slices hosted by the non-public network (S201). A user equipment is configured to select an interworking function of the plurality of interworking functions based on information on a site or network slice the user equipment is associated with, of the plurality of sites or network slices (S203).

1 Claim, 3 Drawing Sheets

(56) References Cited

FOREIGN PATENT DOCUMENTS

| WO | WO-2019097499 A1 | * | 5/2019 | .......... H04L 61/4511 |
| WO | WO-2021050048 A1 | * | 3/2021 | ............ H04W 24/02 |

OTHER PUBLICATIONS

"3rd Generation Partnership Project; Technical Specification Group Services and System Aspects; System Architecture for the 5G System (5GS); Stage 2 (Release 16)", 3GPP TS 23.501 v16.2.0, (Sep. 2019), 391 pages.

"3rd Generation Partnership Project; Technical Specification Group Services and System Aspects; Architecture enhancements for non-3GPP accesses (Release 16)", 3GPP TS 23.402 v16.0.0, (Jun. 2019), 314 pages.

"3rd Generation Partnership Project; Technical Specification Group Services and System Aspects; Procedures for the 5G System (5GS); Stage 2 (Release 16)", 3 GPP TS 23.502 v16.2.0, (Sep. 2019), 525 pages.

"3rd Generation Partnership Project; Technical Specification Group Core Network and Terminals; Numbering, addressing and identification (Release 16)", 3GPP TS 23.003 v16.0.0, (Sep. 2019), 134 pages.

DeKok, A., "The Network Access Identifier", Internet Engineering Task Force (IETF) Request for Comments 7542, (May 2015), 30 pages.

International Search Report and Written Opinion for Patent Cooperation Treaty Application No. PCT/US2019/053981 dated Jun. 8, 2020, 20 pages.

China Telecom, "On Private Network Support for NG-RAN", 3GPP TSG RAN WG3 #105, R3-193832, (Aug. 26-30, 2019), 8 pages.

Ericsson, "Introducing Support for Non-Public Networks", 3GPP TSG-SA WG2 Meeting #130, S2-1900122, Change Request 0757, (Jan. 21-25, 2019), 16 pages.

International Search Report and Written Opinion for Patent Cooperation Treaty Application No. PCT/US2019/053758 dated Jun. 2, 2020, 20 pages.

* cited by examiner

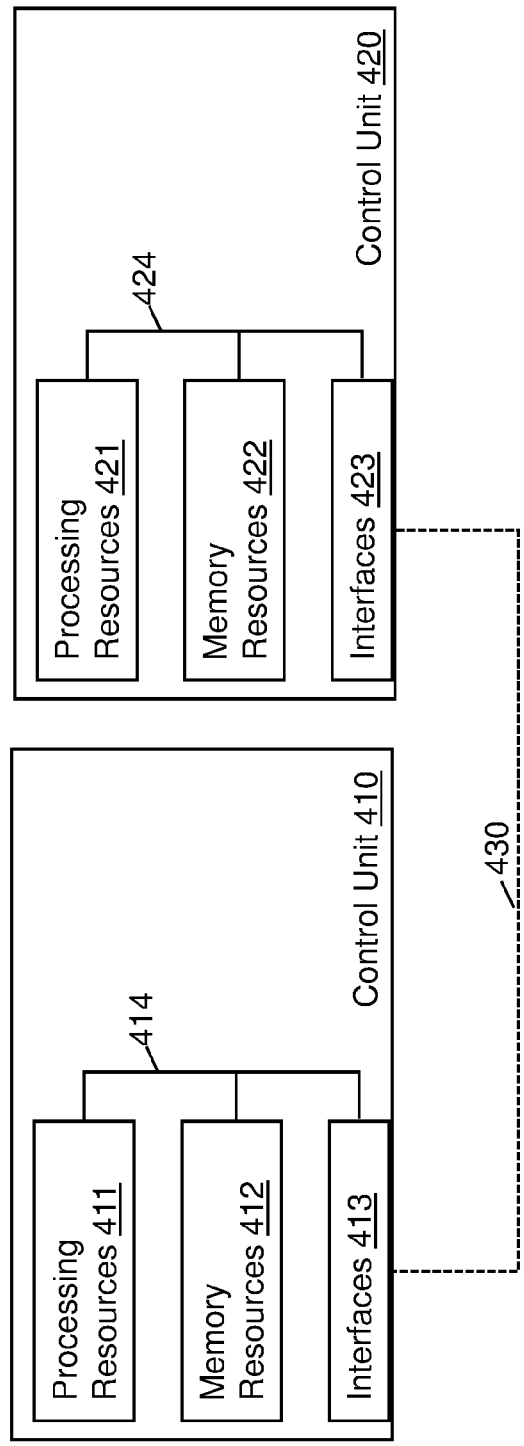

NON-3GPP INTERWORKING FUNCTION (N3IWF) SELECTION FOR STAND-ALONE NON-PUBLIC NETWORKS (SNPN)

CROSS-REFERENCE TO RELATED APPLICATIONS

This application is a national phase entry of International Application No. PCT/US2019/053981 filed Oct. 1, 2019 which claims priority from International Application No. PCT/US2019/053758 filed Sep. 30, 2019, the entire contents of both of which are incorporated herein by reference.

TECHNICAL FIELD

At least some example embodiments relate to non-3GPP interworking function selection for stand-alone non-public networks.

LIST OF ABBREVIATIONS

3GPP 3rd Generation Partnership Project
5G 5th generation cellular telephony system
5G-AN 5G Access Network
5GC 5G CN
5GS 5G System
AMF Access and Mobility management Function
AS Access Stratum
CN Core Network
DNS Domain Name Server
FQDN Fully Qualified Domain Name
IPSec Internet Protocol Security
IT Information Technology
N3IWF Non-3GPP InterWorking Function
NAS Non-Access Stratum
NG Next Generation
NPN Non-Public Network
NSSAI Network Slice Selection Assistance Information
PCF Policy Control Function
PDN Packet Date Network
PLMN Public Land Mobile Network
RAN Radio Access Network
SA Security Association
SD Slice Differentiator
S-NSSAI Single NSSAI
SST Slice/Service Type
SUPI Subscriber Permanent Identifier
UCU UE Configuration Update

BACKGROUND

3GPP is specifying in Release 16 system enhancements required for 5G system to support new vertical service requirements, including in particular the support of Non-Public Network (NPN).
  NPNs may be of the following types:
  Public network integrated NPN: A non-public network deployed with the support of a PLMN.
  Stand-alone Non-Public Network: A non-public network not relying on network functions provided by a PLMN.
  Stand-alone NPNs (SNPNs) can be run by organizations using their self-controlled IT resources such as organization specific domain names in the Domain Name System (DNS). They may be deployed across multiple disjoint sites. Each site may support site-specific services and networking features and may further deploy specific network slices for different purposes. It may be required that each site is capable for autonomous operation, i.e. it has no dependency on other sites. It may also be required that any data at rest or in transit (sent over the network) stays within the site at all times. In addition to 3GPP-based access networks the sites may utilize non-3GPP access networks.

In addition to accessing an SNPN directly through an SNPN dedicated 3GPP access network, a UE may access the SNPN and its services in the following ways:
1. A non-3GPP access network deployed by the same organization as the SNPN (this can be e.g. a Wi-Fi network on the same site and premises as the 3GPP access network of the SNPN, meant for accessing (some of) the same services)
2. Any external non-3GPP access network
3. Any external 3GPP access network (either a PLMN or another SNPN with 3GPP RAN deployed)

Whether these methods are allowed for the UE depends e.g. on the UE credential, subscription with SNPN, SNPN policy. For instance, if all data specific to a particular service (or slice) is to remain at the site at all times, only method 1 is allowed. If remote access from anywhere is desirable, also methods 2 and 3 become relevant with some possible restrictions.

According to 3GPP specifications, these access methods can be supported by the UE establishing an IPSec tunnel to N3IWF function within the SNPN. First, the UE needs to discover an IP address of the N3IWF. This can be done by the UE through a DNS query supplying a hostname of the N3IWF, with the UE being configured with an FQDN of the N3IWF to select an N3IWF deployed in the SNPN.

SUMMARY

However, in a multi-site and/or multi-slice SNPN deployment as described above, it would be beneficial for the UE to be able to pinpoint an N3IWF serving a specific site and/or a specific slice. This should be based on as little manual configuration as possible, using an organization specific DNS domain, giving full control to the organization IT administration.

At least some example embodiments aim at utilizing information on a stand-alone non-public network for N3IWF selection.

According to at least some example embodiments, this is achieved by the methods, apparatuses and non-transitory computer-readable storage media specified by the appended claims.

At least some example embodiments enable an option for SNPN administrators to configure UEs to select a site and/or slice specific N3IWF based on an SNPN SUPI realm, a site-specific Tracking Area Identifier (TAI) broadcast by the site's SNPN cells and/or network slice selection assistance information. Tracking Area Code within the TAI is configured in the cells and broadcast by the cells.

In addition, according to at least some example embodiments, the SNPN can provide information on how to build the FQDN for N3IWF selection towards the UE using NAS signaling (e.g. initial Registration accept, UCU, UDM configuration data, etc.). According to an example implementation, the information on how to build the FQDN for N3IWF selection is part of UCU or UDM configuration data.

At least some example embodiments allows a UE to build an N3IWF FQDN for selection of a N3IWF for SNPN without the need for the operator to configure a specific N3IWF FQDN in the UE.

In the following the invention will be described by way of embodiments thereof with reference to the accompanying drawings.

BRIEF DESCRIPTION OF THE DRAWINGS

FIG. 4 shows a schematic block diagram illustrating a configuration of control units in which example embodiments are implementable.

DESCRIPTION OF THE EMBODIMENTS

A UE selects an N3IWF when registering to a 5GC of an SNPN via a non-3GPP access network, via a PLMN with a 3GPP access network, or via another SNPN with 3GPP access network.

Figure 1:
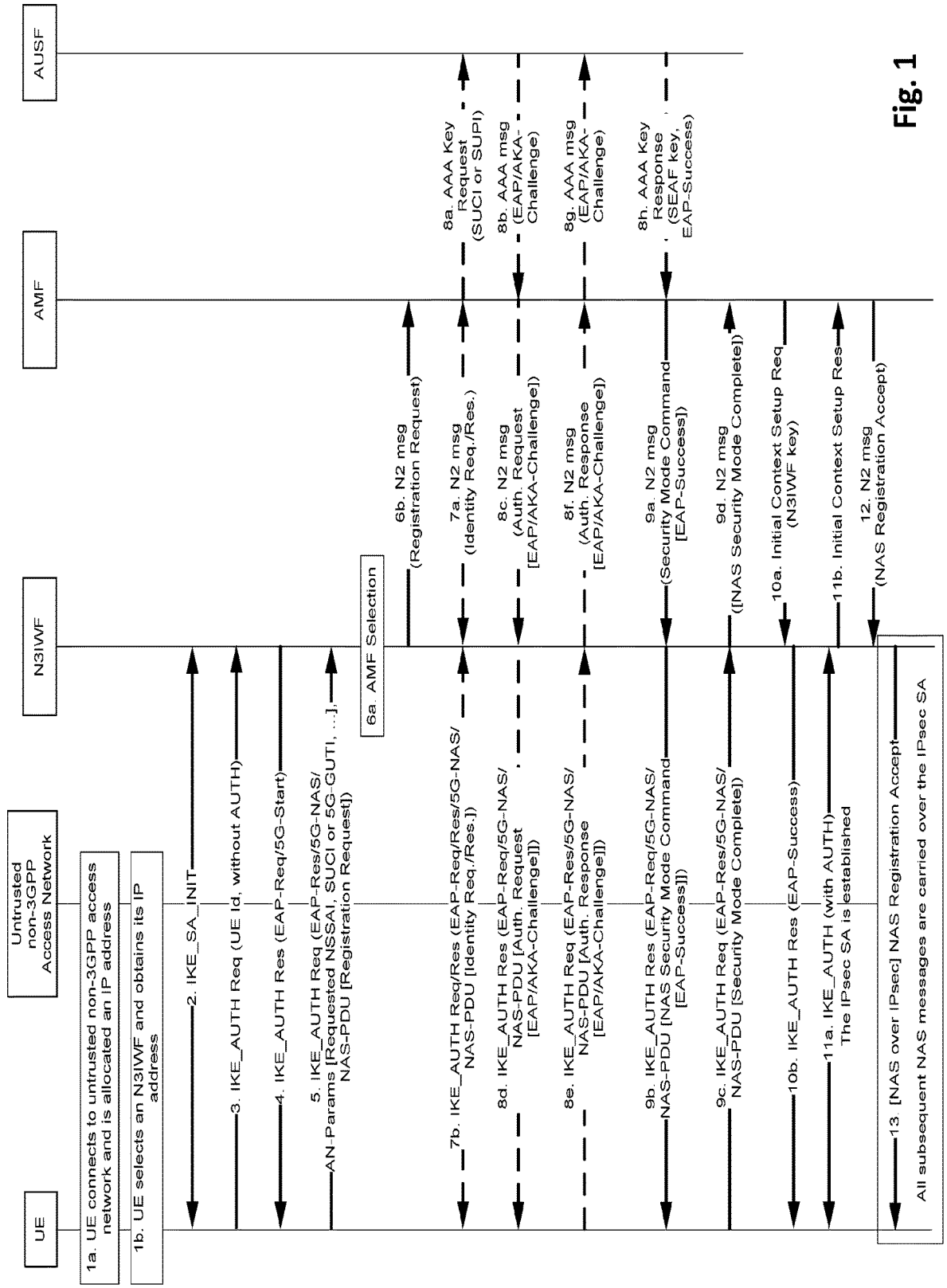
FIG. 1 shows a signaling diagram illustrating a registration procedure for an untrusted non-3GPP access.

FIG. 1 shows a signaling diagram illustrating a registration procedure for an untrusted non-3GPP access.

In step 1a, the UE connects to an untrusted non-3GPP access network and it is assigned an IP address. Any non-3GPP authentication method can be used, e.g. no authentication (in case of a free WLAN), EAP with pre-shared key, username/password, etc.

When the UE decides to attach to 5GC of an SNPN, in step 1b, the UE selects an N3IWF in the SNPN.

According to at least some example embodiments, the N3IWF selection for an SNPN is extended so that the UE can automatically discover and select a site and/or slice specific N3IWF within the SNPN.

According to at least some example embodiments, UEs are configured, e.g. by SNPN administrators or the SNPN network, to select a site and/or slice specific N3IWF based on SNPN SUPI realm, site-specific Tracking Area Identifier (TAI) broadcast by the site's SNPN cells and/or network slice selection assistance information. Tracking Area Code within the TAI is configured in the cells and broadcast by the cells. Further details will be described later on.

In addition, according to at least some example embodiments, the SNPN network can provide the information on how to build an FQDN for N3IWF selection towards the UE using NAS signaling (e.g. initial Registration accept, UCU, UDM configuration data, etc.). Alternatively or in addition, according to at least some example embodiments, the information on how to build an FQDN for N3IWF selection is provisioned to the UE using policies for 5GS configured in the UE. According to an example implementation, the information on how to build the FQDN for N3IWF selection is part of UCU or UDM configuration data.

In step 2, the UE proceeds with the establishment of an IPsec Security Association (SA) with the selected N3IWF.

In steps 3 to 5, authentication is performed between the UE and the N3IWF.

In step 6a, the N3IWF selects an AMF based on information received in the authentication in step and local policy. In step 6b, the N3IWF forwards a registration request to the selected AMF.

In steps 7a to 11b, signaling IPsec SA is established and authentication is performed between the AMF, an AUSF and the UE.

In step 12, the AMF sends an NAS Registration Accept message to the N3IWF. The N2 Message includes an Allowed NSSAI for the access type for the UE.

Finally, in step 13, the N3IWF forwards the NAS Registration Accept to UE via the established signaling IPsec SA.

Figure 2:
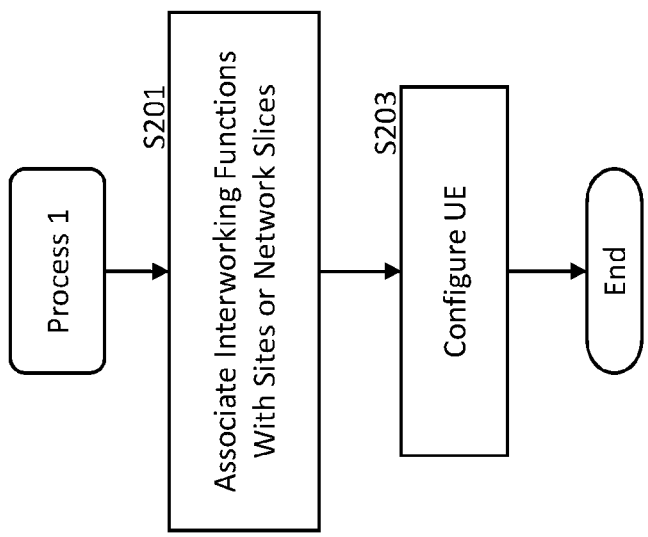
FIG. 2 shows a flowchart illustrating a process for a network operator side according to at least some example embodiments.

Now reference is made to FIG. 2 illustrating a process 1 according to at least some example embodiments. According to an example implementation, process 1 is executed using a network entity associated with the SNPN.

In step S201, a plurality of interworking functions (e.g. N3IWFs), which provide interworking between a communication network acting as an access network (e.g. 3GPP access network, untrusted non-3GPP access network) and a non-public network (e.g. SNPN), is associated with a plurality of sites or network slices hosted by the non-public network.

In step S203, a UE is configured to select an interworking function of the plurality of interworking functions based on information on a site or network slice the user equipment is associated with, of the plurality of sites or network slices. Then process 1 ends.

According to an example implementation, the configuring is performed using non-access stratum, NAS, signaling. For example, the configuring of the UE to select the interworking function comprises providing information on how to build an FQDN for N3IWF selection towards the UE e.g. using NAS signaling (e.g. initial Registration accept, UCU, UDM configuration data, etc.). Alternatively or in addition, according to at least some example embodiments, the configuring is performed using policies for 5GS configured in the UE. According to an example implementation, the information on how to build the FQDN for N3IWF selection is part of UCU or UDM configuration data.

Figure 3:
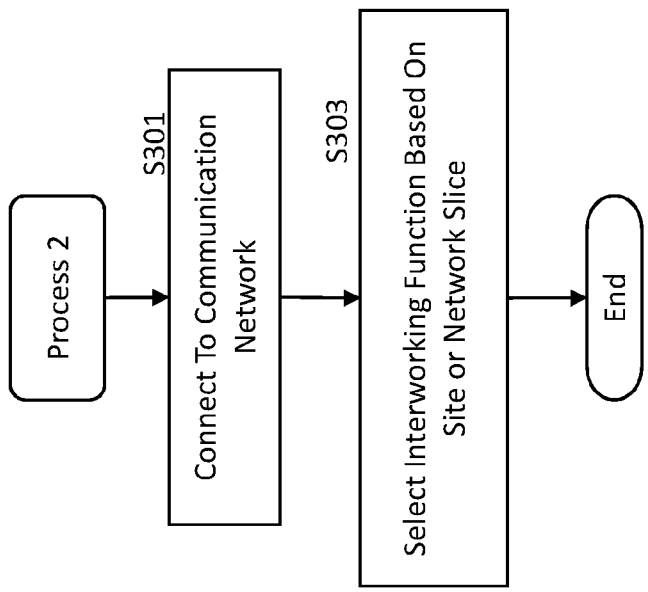
FIG. 3 shows a flowchart illustrating a process for a user equipment side according to at least some example embodiments.

FIG. 3 illustrates a process 2 according to at least some example embodiments. According to an example implementation, process 2 is executed by a UE.

In step S301, connection to a communication network acting as an access network (e.g. 3GPP access network, untrusted non-3GPP access network) is performed. According to an example implementation, step S301 corresponds to step 1a of FIG. 1.

In step S303, an interworking function (e.g. N3IWF), which provides interworking between the communication network acting as an access network and a non-public network (e.g. SNPN), is selected based on information on a site or network slice hosted by the non-public network, wherein the user equipment is associated with the site or network slice. Then process 2 ends.

It is noted that a network slice is a logical network that provides specific network capabilities and network characteristics. For example, the network slice comprises Core Network Control Plane and User Plane Network Functions, and, in the SNPN, the N3IWF functions.

According to an example implementation, the above-described communication network acting as the access network comprises a PLMN.

According to another example implementation, the above-described communication network acting as the access network comprises a Non-Public Network.

According to still another example implementation, the above-described communication network acting as the access network comprises the same network as the non-public network.

According to an example implementation, the above-described information on the site or network slice comprises a subscriber permanent identifier for accessing the non-public network. For example, the UE is configured with a SUPI (Subscriber Permanent Identifier) for accessing the SNPN (including credentials) including the username in a form 'user@realm' (e.g. user@acme.com for SNPN run by Acme Corp with ownership to domain name acme.com). According to the example implementation, the UE uses the configured SUPI for selecting the N3IWF.

According to an example implementation, the above-described information on the site or network slice further comprises an identifier of the site broadcast by radio cells of the site that the user equipment is allowed to access. For example, 3GPP SNPN radio cells on each site of the SNPN may be configured to broadcast a site-specific Tracking Area Identifier (TAI) comprising a PLMN ID and Tracking Area Code. According to the example implementation, the UE uses the received TAI for selecting the N3IWF.

According to an example implementation, the above-described information on the site or network slice further comprises an identity of the network slice the user equipment is accessing. For example, the UE is configured with an S-NSSAI including both Slice/Service Type (SST) and Slice Differentiator (SD). According to the example implementation, the UE uses at least one of the configured SST and SD for selecting the N3IWF.

According to an example implementation, e.g. in step S203 of FIG. 2, the UE is configured with whether TAI and/or SST and/or SD should be used during N3IWF selection for the given SNPN. For example, the SNPN provides this information to the UE as part of UCU or UDM configuration data using NAS signaling. According to another example, this information is provided to the UE using policies for 5GS configured in the UE. For example, this information is defined by defining a new value of the FQDN format field of N3AN node selection information.

According to at least some example implementations, based on the above information, the UE determines and dynamically builds an N3IWF FQDN that includes the realm, the 5GS TAC (Tracking Area Code) and/or the S-NSSAI in a specific format. In the following, examples for such specific format are given:

[[sd<slide_differentiator>.]sst<slice/
service_type>.snssai.][tac-lb<TAC-low-byte>.tac-mb<TAC-middle-byte>.tac-hb<TAC-high-byte>.5gstac]3gpp-n3iwf<supi_realm>

Brackets [ ] denote optional parts, i.e. the 'sd<slice_differentiator', the 'snssai' subdomain and 'tai' subdomain are optional parts. In case 'tai' subdomain is missing, snssai can directly become a subdomain of <supi_realm>. This means that in practice the following constructions are valid:

sd<slice_differentiator>.sst<slice/
service_type>.snssai.tac-lb<TAC-low-byte>.tac-mb<TAC-middle-byte>.tac-hb<TAC-high-byte>.5gstac.3gpp-n3iwf<supi_realm>for an N3IWF specific to TAI, SST and SD.
sst<slice/service_type>.snssai.tac-lb<TAC-low-byte>.tac-mb<TAC-middle-byte>.tac-hb<TAC-high-byte>.5gstac.3gpp-n3iwf.<supi_realm>for an N3IWF specific to TAI and SST (but not to SD).
tac-lb<TAC-low-byte>.tac-mb<TAC-middle-byte>.tac-hb<TAC-high-byte>.5gstac.3gpp-n3iwf.<supi_realm>for an N3IWF specific to TAI (but not to SST or SD).
sd<slice_differentiator>.sst<slice/
service_type>.snssa.3gpp-n3iwf<supi_realm>for an N3IWF specific to SD and SST (but not TAI).
sst<slice/service_type>.snssai.3gpp-n3iwf<supi_realm>for an N3IWF specific to SST (but not to SD or TAI).
3gpp-n3iwf.<supi_realm>: for an N3IWF specific to SNPN (but not to SD, SST or TAI).

For example,
sd130.sst9.snssai.tac-lb21.tac-mb1a.tac-hb0b.5gstac.3gpp-n3iwf.acme.com for an N3IWF that is specific to SD=130, SST=9 and (site) 5GS TAI=H'0B1A21 for SNPN hosted by an organization owning the domain acme.com.
tac-lb21.tac-mb1a.tac-hb0b.5gstac.3gpp-n3iwf.acme.com for a N3IWF that specific to (site) TAI=H'0B1A21 for SNPN hosted by an organization owning the domain acme.com Regarding SNPN network operations, in a DNS of the SNPN, relevant FQDNs are configured with correct IP address mappings under the domain name used for SNPN subscriptions.

In the examples described above it is assumed that a special subdomain (such as '3gpp-n3iwf') can be standardized and reserved by every SNPN for the purpose of hosting the N3IWF FQDNs. If this is not possible in general or in a particular domain, the UE may still be configured with a different enterprise specific subdomain (e.g. 'n3iwfsubdomain.services.<realm>' or 'n3iwfrealm.acme.com') for this purpose. The information on the site or network slice comprising the TAI and slice specific N3IWF instances can still be discovered automatically and dynamically.

In general, according to at least some example embodiments, the UE discovers site (e.g. TAI) or network slice specific N3IWFs according to SNPN operator policy and information received from the SNPN network. According to an example implementation, this information comprises whether to build an SNPN N3IWF FQDN based on TAI or slice information. It is noted that the UE also knows it should connect to a particular TAI and/or slice for a particular service.

At least some example embodiments serve to solve the following concrete use cases as described below:
a) A UE is taken to any site of a multi-site SNPN and while there it needs to connect to 5GC of that particular site over the non-3GPP access network on that site.
b) A UE is taken to any site of a multi-site SNPN and when moving out of the SNPN coverage wants to maintain connectivity to the 5GC of that particular site through a connection via a PLMN.

According to an example implementation, in both of these cases the UE listens to and stores the TAI value broadcast on the SNPN cell of that site. Based on it and the SUPI realm, it forms an FQDN for N3IWF of form [tac-lb<TAC-low-byte>.tac-mb<TAC-middle-byte>.tac-hb<TAC-high-byte>.5gstac.3gpp-n3iwf.<supi_realm>, as described above, with or without the 'snssai' subdomain. The UE will query N3IWF IP address(es) with that FQDN from the DNS of the SNPN, and when needed, establish the IPSec tunnel to the queried N3IWF IP address(es). This way the UE is certain to get connected to the exact correct site, even if the SNPN is deployed across multiple sites.

Besides, at least some example embodiments also allow a UE to build an N3IWF FQDN for selection of a N3IWF for SNPN without the need for the operator to configure a specific N3IWF FQDN in the UE.

FIG. 4 shows a schematic block diagram illustrating a configuration of control units 410 and 420 in which example embodiments are implementable.

The control unit 410 comprises processing resources (e.g. processing circuitry) 411, memory resources (e.g. memory circuitry) 412 and interfaces (e.g. interface circuitry) 413, connected via a link 414. For example, the memory resources 412 store a program.

According to an example implementation, the control unit 410 is part of and/or used by a network entity. For example, the control unit 410 is configured to realize process 1 shown in FIG. 2.

According to an example implementation, the control unit 410 is coupled to a control unit 420 via a connection 430.

The control unit 420 comprises processing resources (e.g. processing circuitry) 421, memory resources (e.g. memory circuitry) 422 and interfaces (e.g. interface circuitry) 423, connected via a link 424. For example, the memory resources 422 store a program.

According to an example implementation, the control unit 420 is part of and/or used by a UE. For example, the control unit 420 is configured to realize process 2 shown in FIG. 3.

Further, as used in this application, the term "circuitry" refers to one or more or all of the following:
 (a) hardware-only circuit implementations (such as implementations in only analog and/or digital circuitry) and
 (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
 (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the example embodiments may be implemented by computer software stored in the memory resources 412, 422 and executable by the processing resources 411, 421, or by hardware, or by a combination of software and/or firmware and hardware.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

According to an aspect, an apparatus is provided which comprises means for associating a plurality of interworking functions, which provide interworking between a communication network acting as an access network and a non-public network, with a plurality of sites or network slices hosted by the non-public network, and means for configuring a user equipment to select an interworking function of the plurality of interworking functions based on information on a site or network slice the user equipment is associated with, of the plurality of sites or network slices.

According to an example implementation, the apparatus comprises and/or uses the control unit 410 of FIG. 4. Alternatively or in addition, the apparatus executes process 1 shown in FIG. 2.

According to an example implementation, the means for configuring performs the configuring using non-access stratum, NAS, signaling.

According to an example implementation, the means for configuring performs the configuring using policies for fifth generation system, 5GS, configured in the user equipment.

According to an aspect, an apparatus for use by a user equipment is provided. The apparatus comprises means for performing connection to a communication network acting as an access network, and means for selecting an interworking function which provides interworking between the communication network and a non-public network, based on information on a site or network slice hosted by the non-public network, wherein the user equipment is associated with the site or network slice.

According to an example implementation, the apparatus comprises and/or uses the control unit 420 of FIG. 4. Alternatively or in addition, the apparatus executes process 2 shown in FIG. 3.

According to an example implementation, the means for selecting has been configured using non-access stratum, NAS, signaling.

According to an example implementation, the means for selecting has been configured using policies for fifth generation system, 5GS, configured in the user equipment.

According to an example implementation, for selecting the interworking function, the apparatus comprises means for including the information on the site or network slice into a query for an internet protocol address of the interworking function.

According to an example implementation, the information on the site or network slice sent into a query for an internet protocol address includes a domain name that is set to or derived from the domain name of the subscriber permanent identifier or to a domain name pre-configured in the user equipment.

According to an example implementation, the information on the site or network slice further comprises at least one of an identity of the network slice the user equipment is accessing and an identifier of the site broadcast by radio cells of the site that the user equipment is able to access.

According to an example implementation, the identity of the network slice is based on a type and/or service of the network slice.

According to an example implementation, the identity of the network slice is based on the type and/or service of the network slice and a differentiator of the network slice.

According to an example implementation, the identifier of the site broadcast by radio cells of the site that the user equipment is able to access is the identity of a tracking area in which the user equipment is or has been camping on.

According to an example implementation, the interworking function comprises a non-third generation partnership project interworking function.

According to an example implementation, the access network comprises at least one of a non-third generation partnership project access network and a third generation partnership project access network.

According to an example implementation, the non-public network comprises a stand-alone non-public network.

According to an example implementation, the communication network acting as the access network comprises a PLMN.

According to an example implementation, the communication network acting as the access network comprises a Non-Public Network.

According to an example implementation, the communication network acting as the access network comprises the same network as the non-public network.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus for use by a user equipment, the apparatus comprising at least one processor and at least one memory including computer program code, the at least one memory and the computer program code configured to, with the at least one processor, cause the apparatus at least to perform:
   performing connection to a communication network acting as an access network;
   selecting an interworking function which provides interworking between the communication network and a non-public network, based on information on a site or network slice hosted by the non-public network, wherein the user equipment is associated with the site or network slice,
   wherein the selecting has been configured using non-access stratum, NAS, signaling, or policies for fifth generation system, 5GS, configured in the user equipment,
   wherein the information on the site or network slice sent into a query for an internet protocol address includes a domain name that is set to or derived from the domain name of the subscriber permanent identifier or to a domain name pre-configured in the user equipment,
   wherein
      the information on the site or network slice further comprises an identity of the network slice the user equipment is accessing and an identifier of the site broadcast by radio cells of the site that the user equipment is able to access,
      the identity of the network slice is based on a type and service of the network slice,
      the identity of the network slice is based on the type and service of the network slice and a differentiator of the network slice, and
      the identifier of the site broadcast by radio cells of the site that the user equipment is able to access is the identity of a tracking area in which the user equipment is or has been camping on,
   wherein
      the interworking function comprises a non-third generation partnership project interworking function,
      the access network comprises a non-third generation partnership project access network and a third generation partnership project access network,
      the non-public network comprises a stand-alone non-public network,
      the communication network acting as the access network comprises a public land mobile network (PLMN),
      the communication network acting as the access network comprises a Non-Public Network, and
      the communication network acting as the access network comprises the same network as the non-public network; and
   for selecting the interworking function, including the information on the site or network slice into a query for an internet protocol address of the interworking function.

* * * * *